(No Model.) 2 Sheets—Sheet 1.
W. C. HATCHER.
DEVICE FOR TEACHING PENMANSHIP.
No. 364,249. Patented June 7, 1887.
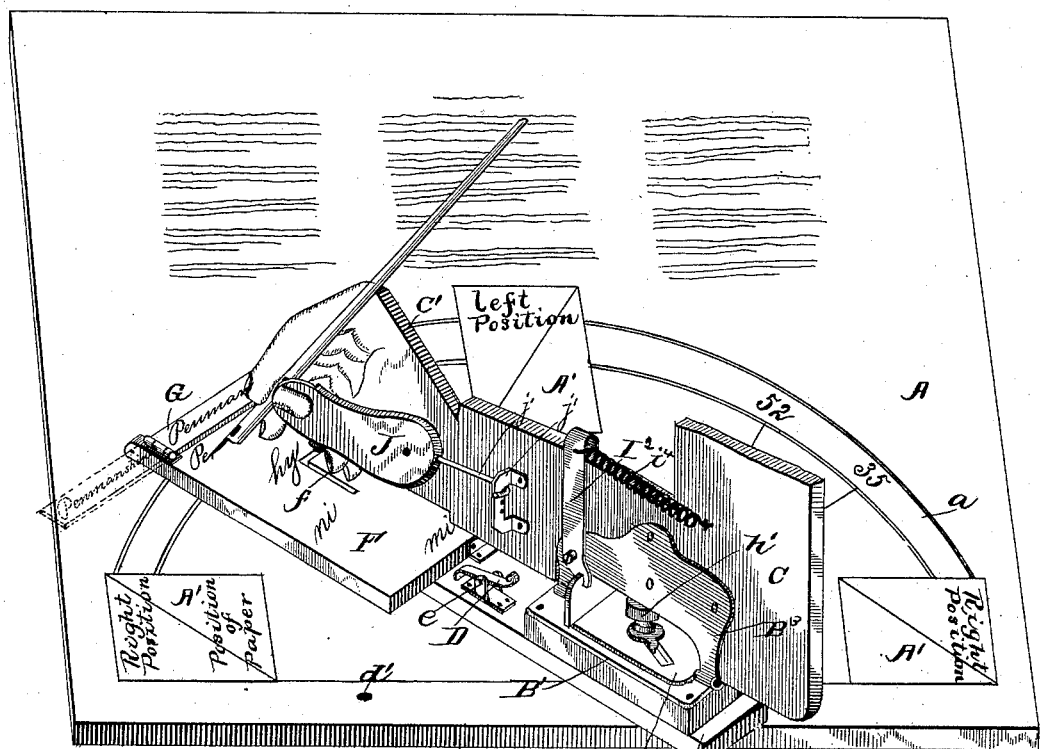
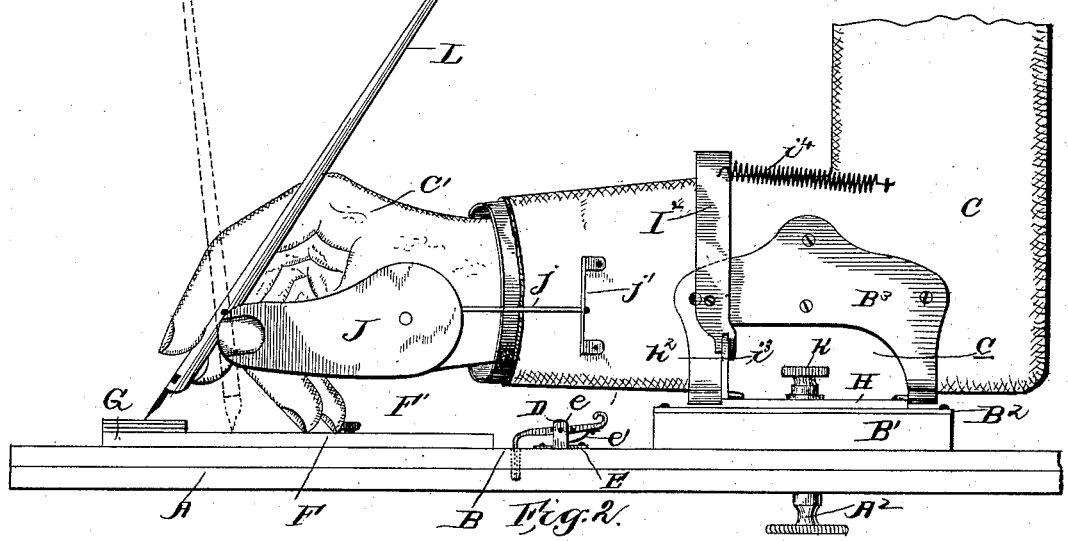
Witnesses
R. C. Laurie
G. P. Kramer
Inventor;
William C. Hatcher
By R. S. & A. P. Lacey
Attys

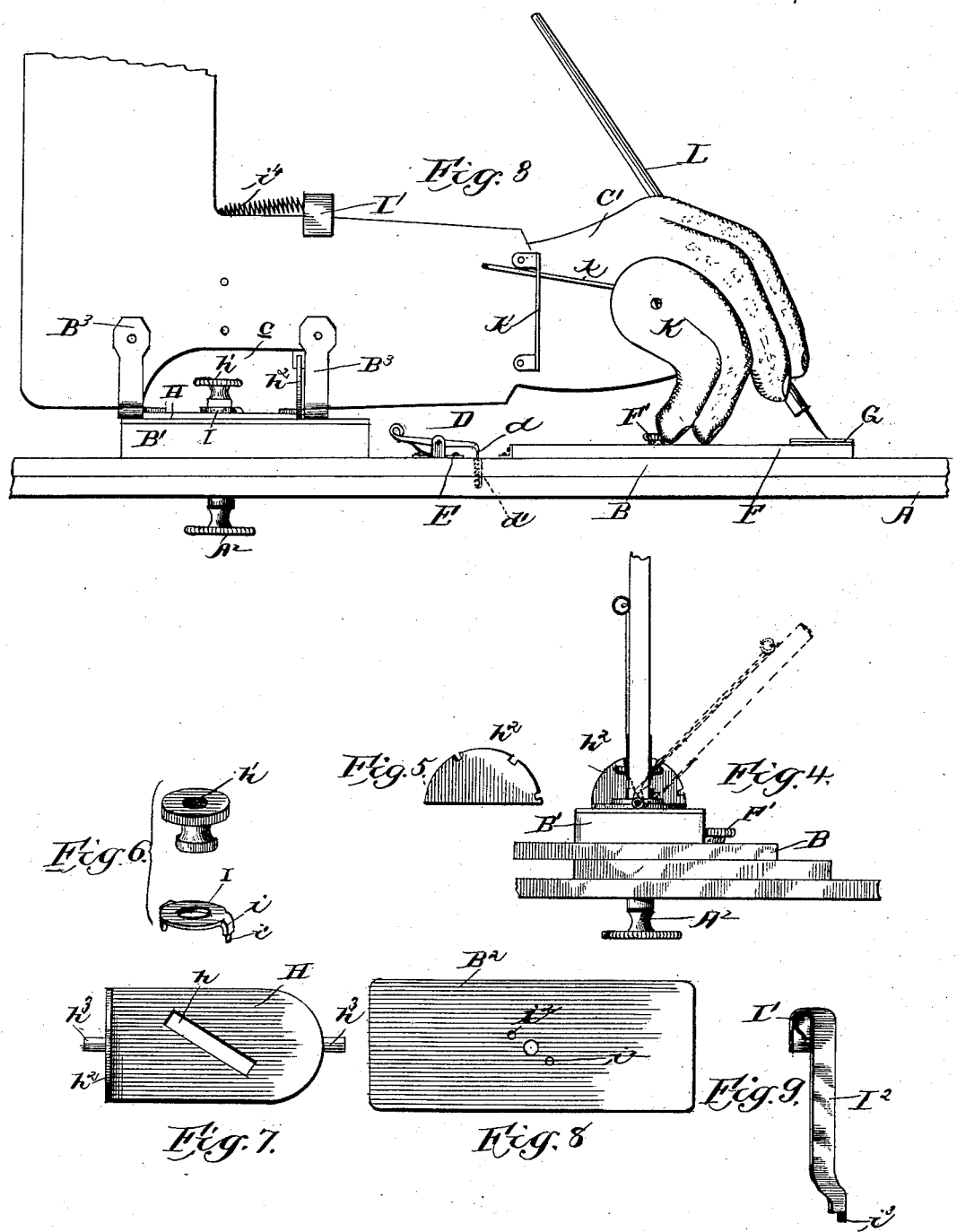

UNITED STATES PATENT OFFICE.

WILLIAM C. HATCHER, OF NORBORNE, MISSOURI.

DEVICE FOR TEACHING PENMANSHIP.

SPECIFICATION forming part of Letters Patent No. 364,249, dated June 7, 1887.

Application filed July 17, 1886. Serial No. 208,283. (No model.)

*To all whom it may concern:*

Be it known that I, WILLIAM C. HATCHER, a citizen of the United States, residing at Norborne, in the county of Carroll and State of Missouri, have invented certain new and useful Improvements in Devices for Teaching Penmanship; and I do declare the following to be a full, clear, and exact description of the invention, such as will enable others skilled in the art to which it appertains to make and use the same, reference being had to the accompanying drawings, and to the letters and figures of reference marked thereon, which form part of this specification.

This invention relates to a device for mechanically teaching penmanship, and has for its object to devise a construction for teaching position and movement of the arm, hand, and pen in ornamental and practical penmanship. It is designed for the student as well as for the teacher. The device can be placed upon the desk or table, or it may be hung upon the wall, and will give the several correct positions of the body, arm, hand, and pen, both for ornamental and practical penmanship, and will also show the corresponding position of the paper to the hand which holds the pen, the lines of which should be at right angles to the forearm of said hand when the paper is in the proper position. It will likewise show the center of movement opposite the center of long words, and will give the center movement opposite the beginning of and closing of long words and the correct slant of all styles of writing.

The invention consists in the novel features more fully hereinafter set forth and claimed, and shown in the annexed drawings, in which—

Figure 1 is a perspective view. Fig. 2 is a side view. Fig. 3 is a reverse side view. Fig. 4 is an end view. Fig. 5 is a detail view of the notched segment-plate for holding the arm at any inclination; Fig. 6, detail views of the thumb-nut and washer for adjustably holding the plate to which the arm and hand are pivoted upon the base. Fig. 7 is a plan view of said plate. Fig. 8 is a top view of the baseplate, and Fig. 9 is a perspective view of the pawl which engages with the notched segment.

The device comprises the chart A, movable base B, and arm C. The chart corresponds with the table or desk which supports the writing material, and before which the student or teacher sits. It is provided with a diagram on the lower portion and directions and instructions on the upper portion, which may be imprinted directly thereon or printed upon paper or board, which is secured thereto in any approved manner. The diagram consists of a semicircle, $a$, graduated to correspond with the correct positions of the paper or tablet when the student is sitting with his front or his right and left side to the desk, and also to show the proper slant of the letters. Radial lines are drawn indicating these positions, and diagrams A' are marked to show the outline and proper position of the paper or tablet corresponding with these various positions.

The movable base B is pivoted at one end corresponding with the center of the circle $a$, and its other end is free to be moved around from right to left, and may be held at any place corresponding with the correct position of the tablet or paper by the catch D, pivoted between the lugs $e$, extending from the plate E, fastened upon the upper side of the base, and having its end $d$ bent down and adapted to enter openings $d'$ in the chart. A spring, $e'$, normally holds the catch D in engagement with the chart.

A tablet, F, is located near the front end of the base and adjustably secured by a set-screw, F', which extends through an L-shaped slot, $f$, formed in said tablet. A model-slip, G, is hinged to the upper end of the tablet, and may be provided with model words or characters on each side, as shown by the dotted lines, Fig. 1, which show the slip thrown back from the tablet, so as to expose the model or pattern on the opposite side and word on the tablet.

The base, at its rear end, is provided with a raised portion, B', on which the arm C is mounted, and held the proper distance from the base, so as to give the hand C' the necessary elevation above the tablet. The arm is mounted upon the raised portion B' at a point between the wrist and elbow corresponding with the rest or center of motion of the forearm of the person when writing. A plate, H, hinged to the arm and having a diagonal slot, $h$, is held to the raised portion by a set-screw or thumb-nut, $h'$. A washer, I, interposed between the nut and plate, and having lugs $i$ extended within the slot, and points $i'$, adapted to enter openings $i^2$ in the plate $B^2$, covering the raised portion $B'$, prevents the binding of the plate H between the nut and covering-plate $B^2$. The lugs $i$ are of a width corresponding with the width of the slot $h$, which they snugly fit, to prevent any lateral motion of the plate in its sliding movement. By this construction the arm may receive a movement in the direction of the slant of the letter with which the direction of the slot $h$ is made to correspond.

The arm has a portion, $c$, removed from its lower edge opposite the point of support $B'$, and the edge is strengthened by a plate, $B^3$, lapped alongside the arm, and having its ends bent around the edge and up on the other side and secured by bolts, the fold being enlarged, forming eyes, which receive the ends or gudgeons $h^3$ of the plate H, for pivotally connecting the arm with the base.

A pawl, $I^2$, pivoted to the arm, has its upper end, $I'$, bent over the edge of the same, as shown, to hold it against lateral displacement. The lower end is adapted to engage a notched segment, $h^2$, projecting from the plate H. A stop, $i^3$, depends from the lower rear corner, to limit the movement and hold the pawl in engagement with the segment, which is normally kept in contact therewith by the spring $i^4$.

The thumb J and the last two fingers, K, are pivotally connected with the hand on opposite sides, and are made adjustable by arms $j\ k$ and notched plates $j'\ k'$, respectively. The pen L is held between the thumb and first and second fingers in the usual manner, and is pivotally connected with the hand, so it can be adjusted into any desired position, according to the style of writing. The end of the thumb adjacent the hand is cut away to permit the various adjustments of the pen and also have it come between the thumb and hand.

It will be noticed that the set-screw $h'$, which holds the arm to the base, is in line with the set-screw $A^2$, which pivotally connects the base B with the chart or support A.

In practice, the arm may be adjusted relative to the chart corresponding with the desired position, whether front, right, or left, by moving the base to the right or left about its pivot. The tablet, being moved simultaneously with the adjustment of the base, will always maintain a correct position relative to the hand. The rolling movement of the arm in ordinary writing may be imitated by the adjustment of the arm C about the plate H, and the forearm movement by the motion of the plate H. The correct movement of the paper, which should be from right to left and upward, is shown by the L-slot in the tablet. By reason of the various adjustments of the several parts every movement of the pen, hand, arm, tablet, position at the desk, &c., may be properly shown by my device, as will be readily comprehended from the foregoing, reference being had to the annexed drawings.

Having thus described my invention, what I claim, and desire to secure by Letters Patent, is—

1. An improved device for teaching penmanship, consisting of the chart or support and the adjustable artificial arm, substantially as described, and for the purpose specified.

2. In a device for teaching penmanship, the combination, with the chart or support, of an artificial arm connected therewith and free to have a slanting reciprocating movement relative thereto, substantially as and for the purposes described.

3. In a device for teaching penmanship, the combination, with the chart or support, of the hinged artificial arm, whereby it may have its slant adjusted relative to the chart, substantially as set forth.

4. In a device for teaching penmanship, the combination, with the chart or support provided with a diagram consisting of a semicircle graduated to indicate the several positions of the arm, tablet, and slant of letters, of an arm mounted upon said chart and having a movement corresponding with these several positions, substantially as described, and for the purposes specified.

5. The combination, with the chart or support graduated as shown and described, of the base pivotally connected therewith, the tablet mounted upon its outer end, and the arm adjustably connected with the inner end, substantially as described.

6. The combination, with the arm, of the tablet having a limited longitudinal and transverse movement relative thereto, substantially as and for the purpose set forth.

7. The combination, with the arm, of the tablet having an L-angled slot formed therein, a set-screw passed through the slot for holding the tablet in place and guiding it in its movements, and a hinged model-plate, substantially as set forth.

8. The combination of the base, a diagonally-slotted plate secured thereto and having a corresponding reciprocating movement, and the arm hinged to the plate and adjustable transversely relative to the base, substantially as and for the purpose described.

9. The combination of the chart graduated as described, the base pivotally connected therewith, the adjustable tablet, the diagonally-slotted plate, and the arm hinged to the plate, substantially as and for the purpose set forth.

10. The combination, with the arm and hand, of the thumb pivotally and adjustably connected therewith, and the rod and notched plate for holding said thumb in an adjusted position, substantially as and for the purpose described.

11. The combination, with the arm and hand, of the two last fingers pivotally and adjustably connected therewith, and the rod and notched plate for positively holding said fingers in an adjusted position, as and for the purposes described.

12. The combination, with the arm and hand, of the pen pivotally connected with the hand and adjustably held between the first and second fingers and the thumb, substantially as and for the purpose described.

13. The combination, with the chart provided with openings, of the base supporting the tablet and arm, pivotally connected therewith, and a catch carried by the base for engaging with the openings and locking the base in an adjusted position, substantially as set forth.

In testimony whereof I affix my signature in presence of two witnesses.

WILLIAM C. HATCHER.

Witnesses:
J. E. MONTGOMERY,
WM. F. MONTGOMERY.